Jan. 14, 1941.　　　　A. SACKAS　　　　2,228,644
MEAT PRESS
Filed Feb. 23, 1938　　　　2 Sheets-Sheet 1
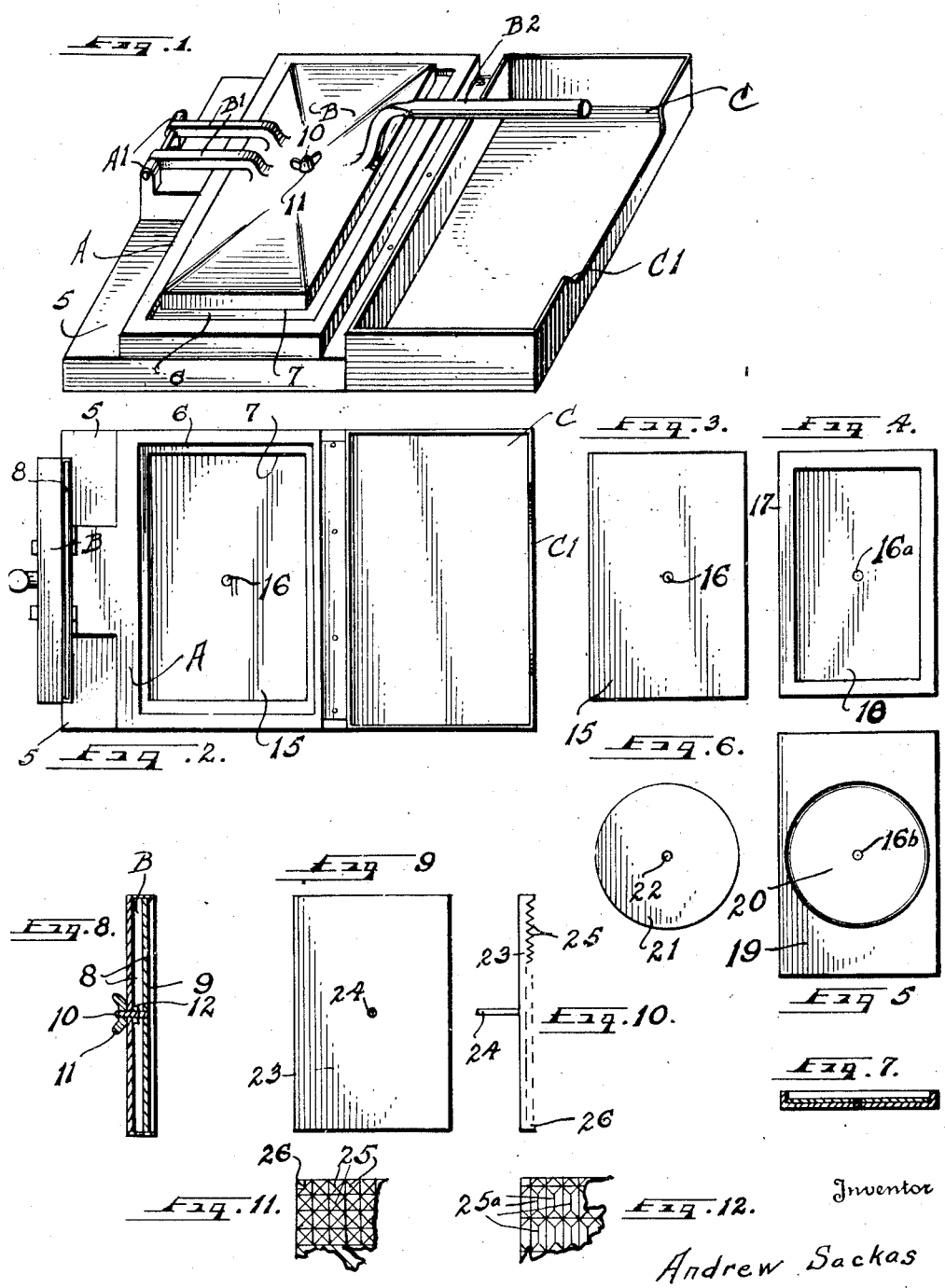
Inventor
Andrew Sackas
By R. M. Thomas
Attorney Jan. 14, 1941.                A. SACKAS                2,228,644
                              MEAT PRESS
                         Filed Feb. 23, 1938           2 Sheets-Sheet 2
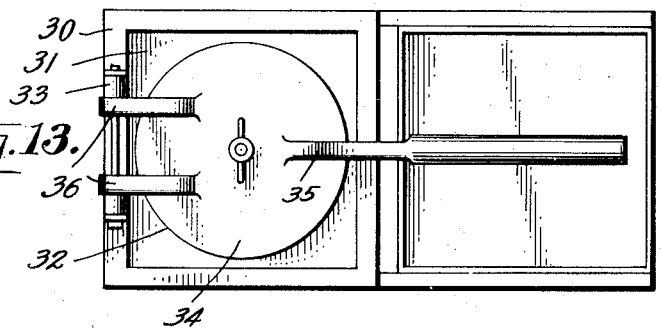
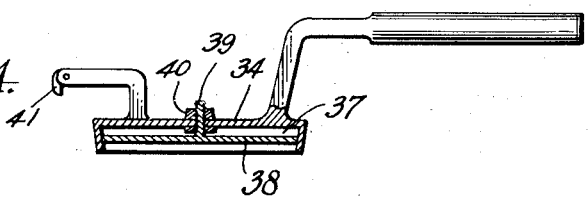
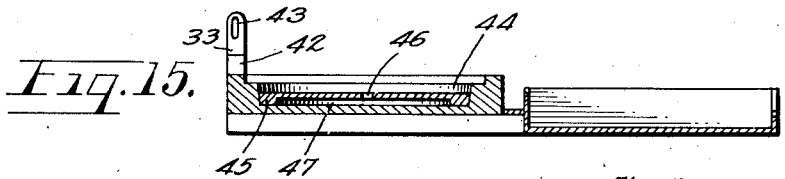
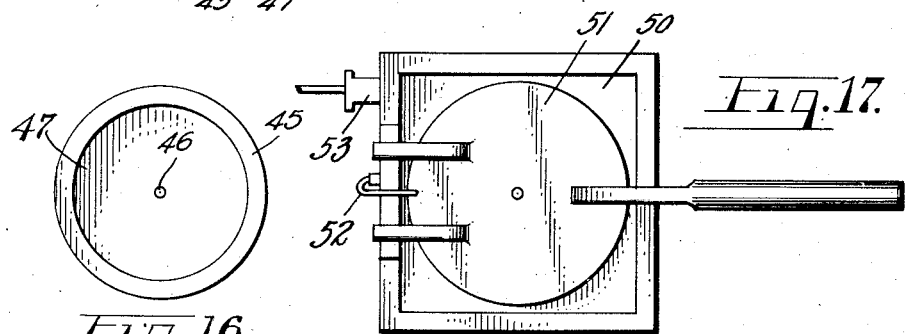
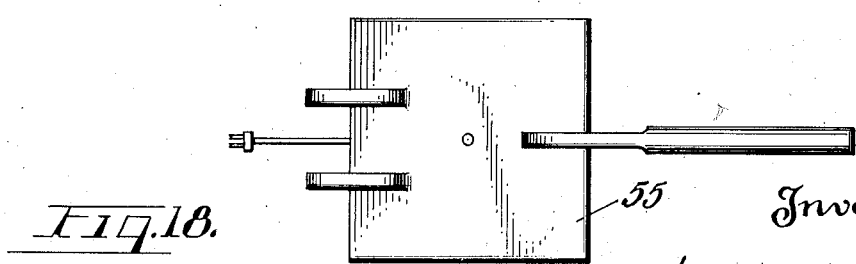
Inventor.
Andrew Sackas
by R. M. Thomas
        Attorney Patented Jan. 14, 1941

2,228,644

UNITED STATES PATENT OFFICE 2,228,644

MEAT PRESS

Andrew Sackas, Salt Lake City, Utah

Application February 23, 1938, Serial No. 191,983

2 Claims. (Cl. 107—15)

My invention relates to meat presses and has for its object to provide a new and highly efficient press for pressing hamburger or like meat into an even thickness of a pattie or the like.

A further object is to provide a meat press which will meet all requirements as to size, thickness of the meat pattie, and which may be adapted to press or cube steaks or to perforate any meat desired to make it more tender and palatable.

A still further object is to provide a meat press which with very slight modifications may be used as a grill for cooking as well as pressing the meat into shape.

A still further object is to provide a meat press in different form which may be utilized in batteries of six or seven in a line to speed the preparation of a lunch counter for the rush hours, eliminating much of the waste time and entirely eliminating any waste of material and which devices which when used with thin sheets of wax paper prevents any of the meat particles from sticking onto the press.

A still further object is to provide a combined meat press and paper receptacle so that the wax paper may be held in a convenient receptacle directly in front of the press to speed up the placing of the paper and the forming of the meat.

These and other objects I accomplish with the device illustrated in the accompanying drawings in which similar numerals and letters of reference indicate like parts throughout the several views and as described in the specification forming a part of this invention and pointed out in the appended claims.

In the drawings in which I have shown my device—

Figure 1 is a perspective view of the entire device closed as in the meat pressing position.

Figure 2 is a plan view of the device with the pressing plate elevated.

Figure 3 is a plan view of the removable insert for the press to vary the thickness of the product or to change the shape.

Figure 4 is an inverted view of figure 3 showing the opposite side thereof with a smaller opening therein for making rectangular shaped meat patties or the like.

Figure 5 is a view of a modified plate having a round opening form forming round hamburgers.

Figure 6 is a view of a round removable thickness guage plate.

Figure 7 is a sectional view of figure 5.

Figure 8 is a sectional view of the pressing plate shown in Figure 2.

Figure 9 is a plan view of the adjustable removable meat cubing or perforating plate.

Figure 10 is an edge view of Figure 9.

Figure 11 is an enlarged view of the face of the plate shown in Figure 9.

Figure 12 is a like view of a modified face for said plate.

Figure 13 is a plan view of a modified form of the entire device to be employed in smaller shops for hamburgers and the like.

Figure 14 is a diametrical section of the pressing head.

Figure 15 is a like section of the base and stand.

Figure 16 is a bottom view of the thickness insert plate used in this type of device.

Figure 17 is a plan view of the device showing the use of an electric system for making the device as a grill.

Figure 18 is a plan view of a square grill top which may be used instead of the round top.

In the drawings I have shown the grill or presser base as A, having a pressing plate B pivotally mounted thereto by pivot arms B1 mounted onto vertical brackets A1 and controlled by a handle B2. The plate A is mounted on a block 1 for support and the top face of the plate A is provided with a depression 6 therein, rectangular in form, and within this depression 6 there is a pressing socket or recess 7 into which the pressing plate B is pressed for forming the meat. If desired, the sidewalls of the recess 7 and the plate B may be tapered.

Onto the front of the block 5 I mount a box like paper receptacle C having the front face cut down at C1 to enable the operator to quickly grasp each succeeding paper therefrom as needed.

The pressing plate B is made with a recess or opening therein with a flange around the perimeter and within this opening there is an adjustable pressing plate 9 mounted on a threaded stud 10. The stud 10 carries an adjustable thumb screw 11 for locking the plate in position and an inner nut 12 for insuring a lock when the plate 9 is set the desired elevation in the plate B. Within the recess 7 of the Base A, there is a thickness guage plate 15 and this plate may be made in several thicknesses and used as an adapter plate. Should smaller portions be desired, the plate may be made as shown in figure 4 with the plate 17 provided with a smaller rectangular opening 18 therein which provides an adjustment for different sizes or portions of meat. A threaded hole 16 is provided in the plate 15 and a like hole 16a in the plate 18 for insertion of a threaded tool for removal of the plates or for turning them over.

In Figures 5 and 6 I have shown another adapting plate as 19 with a circular recess 20 in said plate to allow for making of circular portions of meat such as served in hamburger sandwiches. The plate 21 in Figure 6 is for insertion into the recess 20 for changing the thickness of the portion of meat being pressed. A threaded hole 16b in the plate 19 is for removal or turning of the plate 19 and the plate 21 is provided with a like hole 22 for removal of the plate 21 from the recess 20 when necessary.

Should it be desired to serve steak sandwiches to some customer, the proprietor may remove the plate 9 from the press plate B and insert therein the plate 23. This plate has a central shaft 24 therein to fit through the hole in the plate B and to receive the thumb screw for adjustment of the level of the plate 23 in the plate B. The front face of the plate 23 is made in various forms such as shown in Figures 11 and 12. Points 25 may be made on the face, or long cutting blades 25a may be used, it being optional to the manufacturer.

Each corner will be provided with a lug 26 to prevent the teeth or blades from hitting down on the base of the press or on the plate 15 when the plate is in use.

A modified type of device is shown in Figures 13 to 16 by which the base is shown as 30 having the recess 31 therein and with a pressing block 34 mounted pivotally to the base by arms 36 and brackets 33.

As a means for raising the block from the base in a vertical direction the brackets 33 on the brackets A1 shown in Figures 1 and 2 are provided with lugs 42 and the arms 36 are provided with eccentric blocks 41 to engage the lugs 42. The hole 43 in the brackets is elongated to allow the pivot shaft and entire head to be raised vertically prior to being hingedly pivoted when raising the block from the base.

The block 34 is made circular in this smaller type of device and the base is formed with a circular recess 44 therein into which the head block 34 is pressed. A removable plate 45 may be mounted or carried in the recess 44 for adjusting the depth thereof and therefore the thickness of the portion being pressed.

The bottom side of the plate 45 is provided with a smaller diametered recess 47 for forming smaller portions of meat when desired and the plate is removably carried in the base with a threaded hole 46 to be used for removal of the plate.

The pressing block 34 is recessed and carries an adjustable plate or thickness gauge plate 38 therein with the threaded stud 39 extending up through the top of the block 34 with an adjusting thumb screw or nut screwed thereon, for removal or adjustment thereof.

The operation of the device is as follows:

Sheets of thin waxed paper are placed in the receptacle C and the device is ready for use. Several of the presses may be used in a line and the operator preparing the meat will then place a sheet of wax paper in the recesses 7 and onto each sheet of paper a ball of meat is placed. This places the device in readiness for operation, but before such operation takes place another sheet of wax paper is placed over the ball of meat, and when the operator presses down on the handle B2 the meat will be spread out over the base in an even thickness. The use of the two sheets of wax paper on each side of the meat is used for twofold purpose fully protecting the meat from the head or block and also preventing any hand from touching the meat at any time during the molding thereof.

Having thus described my invention I desire to secure by Letters Patent and claim:

1. A device of the class described for pressing meat patties comprising a rectangular base having upwardly extended brackets at the rear of said base; an elongated recess in said base; a pressing plate fitted into said recess, said pressing plate having a recess formed within its lower face; an adjustable plate carried in said recess said plate to be raised or lowered depending upon the thickness desired in the resulting product; arms formed on the top of said pressing plate and pivoted to the upwardly extending brackets; a handle extended forward from the front side of said pressing plate by which it is operated; and means in the pivotal connection of the arms to the brackets to permit vertical raising of the arms and pressing plate when being withdrawn or entered into the recess in said base.

2. A device of the class described comprising a pivoted pressing head; a recess formed in said head; an adjustable plate carried in said recess having a single central shaft extending upwardly through a hole in said head; a thumbscrew carried on the upper end of said shaft and a nut carried on said shaft between the head and adjustable plate by which the plate may be set and locked in any desired elevation relative to the recess in the head; a recessed base into which said head is to be lowered; brackets on said base to which said head is pivotally attached; and a single handle by which said head is operated.

ANDREW SACKAS.